United States Patent
Tsai et al.

(10) Patent No.: US 7,826,104 B2
(45) Date of Patent: Nov. 2, 2010

(54) HANDHELD RECORDING APPARATUS

(75) Inventors: Chen-Tsai Tsai, Hsinchu (TW); Hsuan-Yang Lin, Taichung (TW); Chung-Lung Yu, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 920 days.

(21) Appl. No.: 11/679,037

(22) Filed: Feb. 26, 2007

(65) Prior Publication Data
US 2008/0094664 A1    Apr. 24, 2008

(30) Foreign Application Priority Data
Oct. 18, 2006  (TW)  .............................. 95138362 A

(51) Int. Cl.
  *H04N 1/04*  (2006.01)
(52) U.S. Cl. ...................... 358/473; 358/472; 358/296; 358/474
(58) Field of Classification Search ................ 358/473, 358/472, 296, 474, 1.18
See application file for complete search history.

(56) References Cited

U.S. PATENT DOCUMENTS

| | | | |
|---|---|---|---|
| 5,063,451 A | 11/1991 | Yanagisawa et al. | |
| 6,499,840 B2 * | 12/2002 | Day et al. | 347/100 |
| 6,688,739 B2 * | 2/2004 | Murray | 347/104 |
| 6,846,119 B2 * | 1/2005 | Walling | 400/88 |
| 6,991,332 B1 * | 1/2006 | Fan et al. | 347/109 |

* cited by examiner

*Primary Examiner*—Houshang Safaipour

(57) ABSTRACT

A handheld recording apparatus. A casing includes a first sidewall and a second sidewall opposite thereto. The second sidewall includes a recording through hole. A transparent positioning window is disposed in the first sidewall and corresponds to the recording through hole. A recording mechanism is movably disposed in the casing and records information via the recording through hole. A drive mechanism is disposed in the casing and is connected to the recording mechanism, moving the recording mechanism.

10 Claims, 7 Drawing Sheets

HANDHELD RECORDING APPARATUS

BACKGROUND OF THE INVENTION

1. Field of the Invention

The invention relates to a handheld recording apparatus, and more particularly to a handheld recording apparatus providing precise recording.

2. Description of the Related Art

Referring to FIG. 1, U.S. Pat. No. 5,063,451 discloses a handheld recording apparatus 10 comprising an upper jaw portion 1, a lower jaw portion 2, a recording head 3, a driving means 4, and a positioning portion 5. The upper jaw portion 1 is rotatably connected to the lower jaw portion 2, opening from and closing to the lower jaw portion 2. The recording head 3 and driving means 4 are disposed in the upper jaw portion 1. The driving means 4 drives the recording head 3. The positioning portion 5 is disposed in the lower jaw portion 2.

When using the handheld recording apparatus 10 to record or print information on a recording medium 6 (such as a paper sheet), a user must move the handheld recording apparatus 10 on the recording medium 6 and visually select a specific recording position or area on the recording medium 6 via the positioning portion 5. After the specific recording position or area on the recording medium 6 is selected, the upper jaw portion 1 is rotated and closed to the lower jaw portion 2. The handheld recording apparatus 10 is then actuated, recording the information in the specific recording position or area on the recording medium 6.

The handheld recording apparatus 10, however, presents several drawbacks during recording operation. The handheld recording apparatus 10 is often moved when the upper jaw portion 1 is rotated and closed to the lower jaw portion 2, causing the information recorded by the recording head 3 to deviate from the selected specific recording position or area. Moreover, before the handheld recording apparatus 10 records the information on the recording medium 6, the upper jaw portion 1 must be rotated and closed to the lower jaw portion 2, thus causing inconvenience of operation.

Hence, there is a need for a handheld recording apparatus providing rapid and precise recording of information onto a recording medium.

BRIEF SUMMARY OF THE INVENTION

A detailed description is given in the following embodiments with reference to the accompanying drawings.

An exemplary embodiment of the invention provides a handheld recording apparatus comprising a casing, a transparent positioning window, a recording mechanism, and a drive mechanism. The casing comprises a first sidewall and a second sidewall opposite thereto. The second sidewall comprises a recording through hole. The transparent positioning window is disposed in the first sidewall and corresponds to the recording through hole. The recording mechanism is movably disposed in the casing and records information via the recording through hole. The drive mechanism is disposed in the casing and is connected to the recording mechanism, moving the recording mechanism.

The transparent positioning window comprises at least one positioning index corresponding to the recording through hole.

The handheld recording apparatus further comprises a guide bar disposed in the casing and on which the recording mechanism moves.

The drive mechanism comprises a motor and a transmission belt connected to the motor and recording mechanism.

The size of the recording through hole exceeds that of the transparent positioning window.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

First Embodiment

Figure 1:
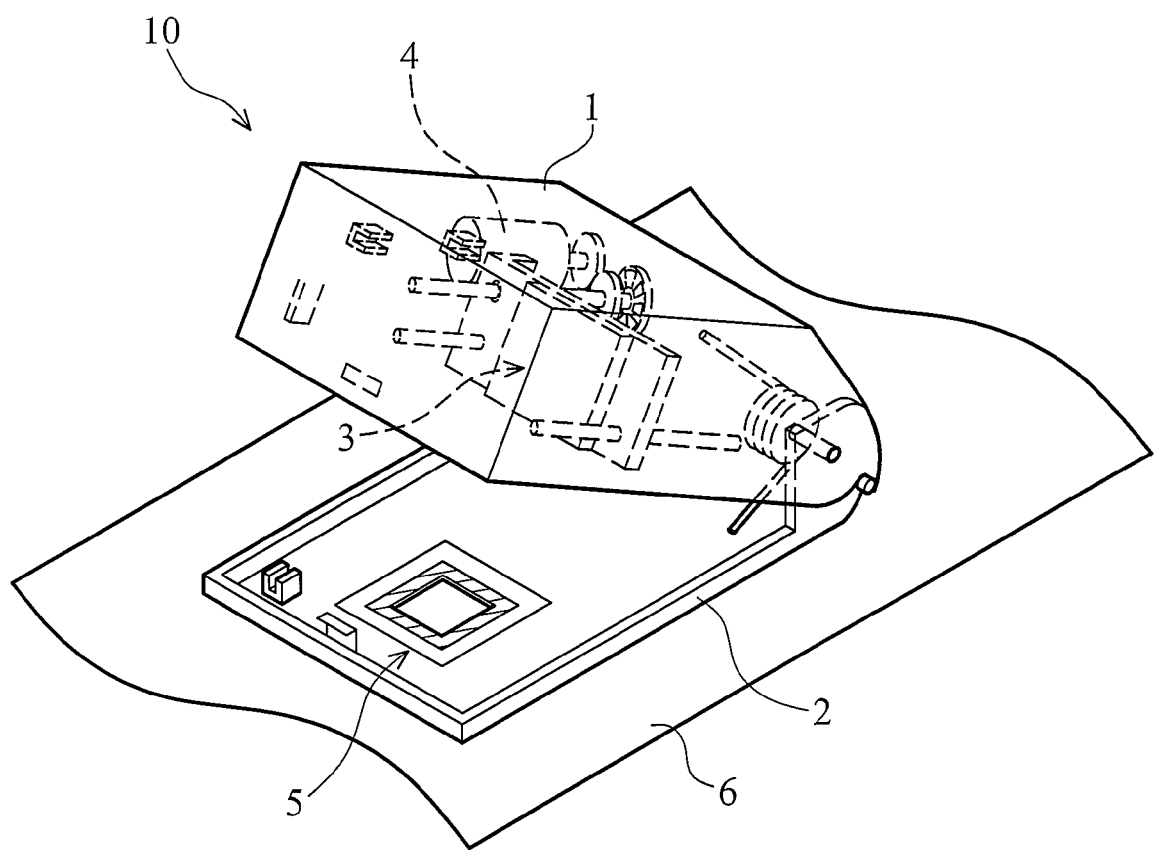
FIG. 1 is a schematic perspective view of a conventional handheld recording apparatus.
Figure 2A:
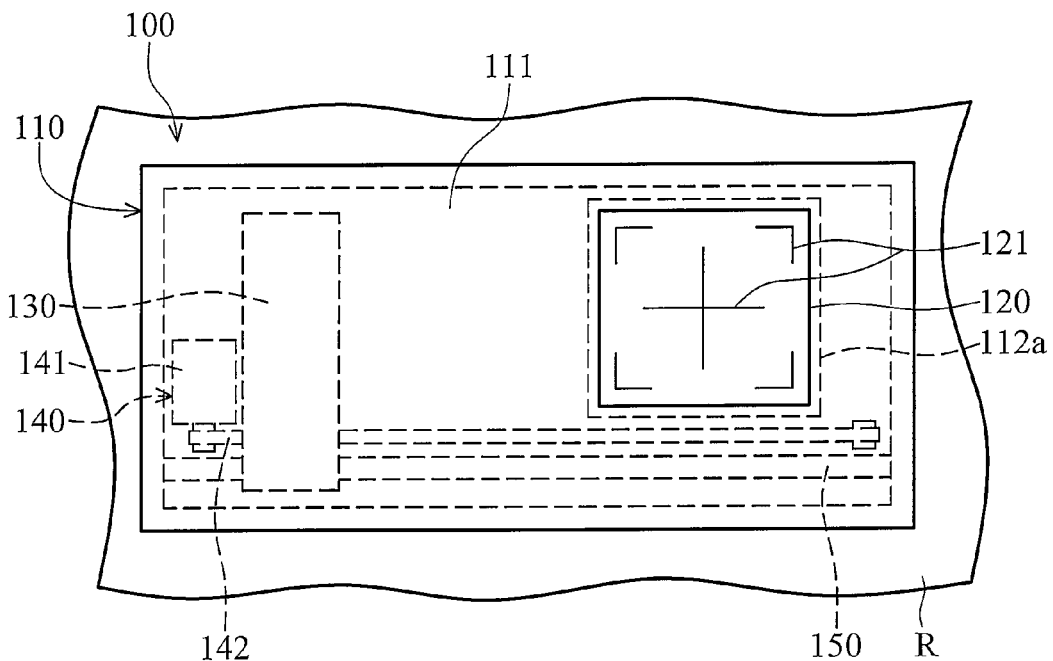
FIG. 2A is a schematic top view of a handheld recording apparatus of a first embodiment of the invention.
Figure 2B:
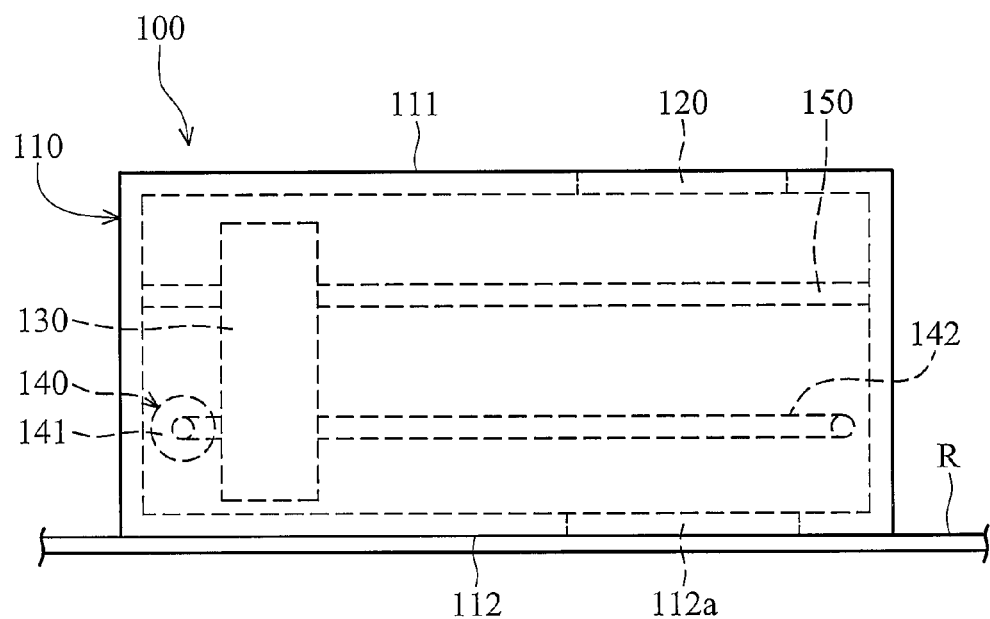
FIG. 2B is a schematic side view of the handheld recording apparatus of the first embodiment of the invention.

Referring to FIG. 2A and FIG. 2B, a handheld recording apparatus 100 comprises a casing 110, a transparent positioning window 120, a recording mechanism 130, a drive mechanism 140, and a guide bar 150.

The casing 110 comprises a first sidewall 111 and a second sidewall 112 opposite thereto. The second sidewall 112 comprises a recording through hole 112a.

The transparent positioning window 120 is disposed in the first sidewall 111 and corresponds to the recording through hole 112a of the second sidewall 112. Moreover, as shown in FIG. 2A, the transparent positioning window 120 comprises a plurality of positioning indices 121. The positioning indices 121 may be printed on the transparent positioning window 120 and correspond to the recording through hole 112a. Additionally, the size of the recording through hole 112a may slightly exceed that of the transparent positioning window 120.

The recording mechanism 130 is movably disposed in the casing 110 and records information via the recording through hole 112a of the second sidewall 112. The recording mechanism 130 may comprise an inkjet head (not shown) recording the information on a recording medium R (such as a paper sheet) via the recording through hole 112a.

The drive mechanism 140 is disposed in the casing 110 and is connected to the recording mechanism 130, moving the recording mechanism 130. Specifically, the drive mechanism 140 comprises a motor 141 and a transmission belt 142 connected to the motor 141 and recording mechanism 130. Accordingly, the transmission belt 142 is operated by the motor 141, and the recording mechanism 130 moves by transmission of the transmission belt 142.

The guide bar 150 is disposed in the casing 110. The recording mechanism 130 fits and moves on the guide bar 150.

Additionally, the handheld recording apparatus 100 may be connected to an information processing device, such as a computer host, by a signal transmission cable or wireless transmission, receiving the information to be recorded or printed.

Figure 2C:
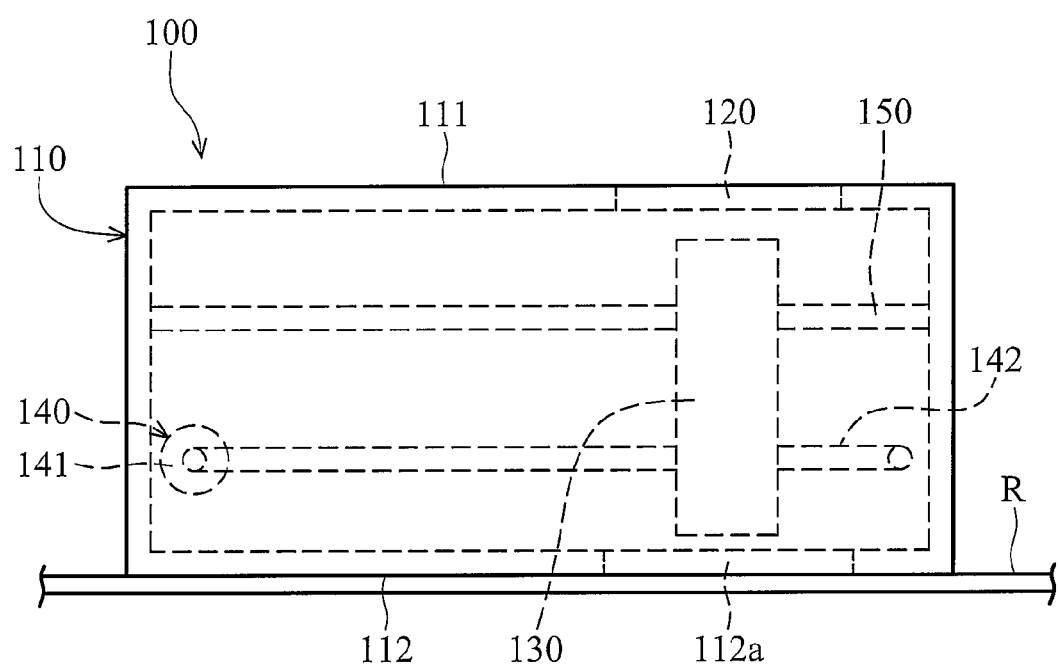
FIG. 2C is another schematic side view of the handheld recording apparatus of the first embodiment of the invention.

As shown in FIG. 2A and FIG. 2B, when using the handheld recording apparatus 100 to record the information on the recording medium R, a user can move the handheld recording apparatus 100 on the recording medium R and visually observe or select a specific recording position or area on the recording medium R via the transparent positioning window 120 and recording through hole 112a. Here, the positioning indices 121 on the transparent positioning window 120 assist in selecting the recording area. Then, the handheld recording apparatus 100 can be directly actuated to record the information. For example, the user can just press a button (not shown) connected to the handheld recording apparatus 100 to record the information. At this point, the drive mechanism 140 moves the recording mechanism 130 to the recording through hole 112a along the guide bar 150, and the recording mechanism 130 records the information in the specific recording position or area on the recording medium R, as shown in FIG. 2C.

Accordingly, the handheld recording apparatus 100 rapidly and precisely records the information in the specific recording position or area on the recording medium R without deviation.

Second Embodiment

Figure 3A:
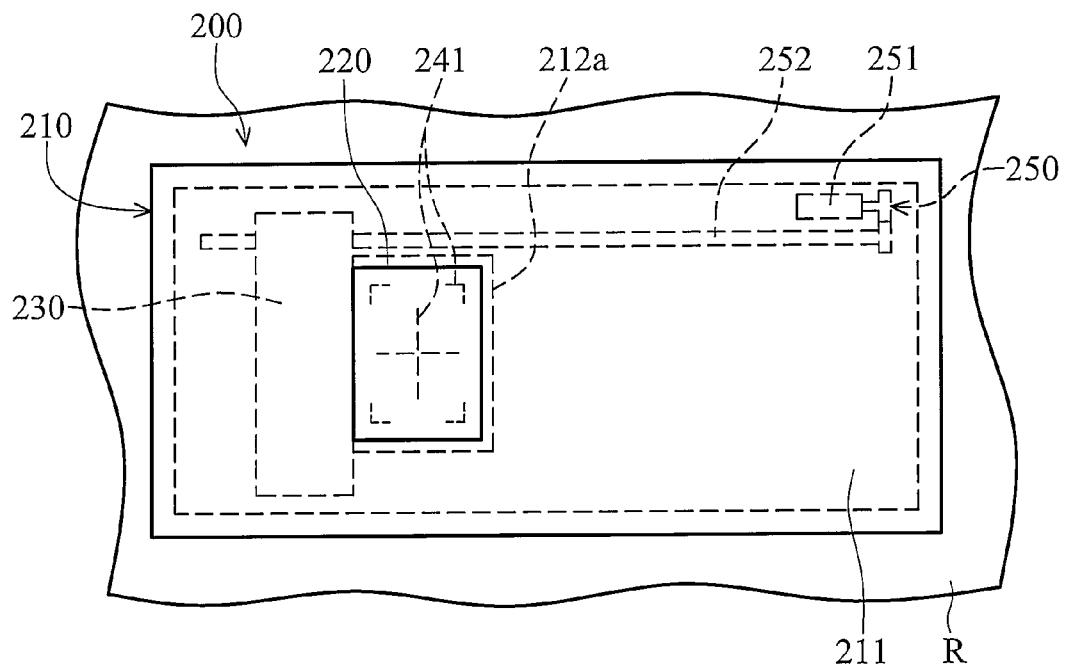
FIG. 3A is a schematic top view of a handheld recording apparatus of a second embodiment of the invention.
Figure 3B:
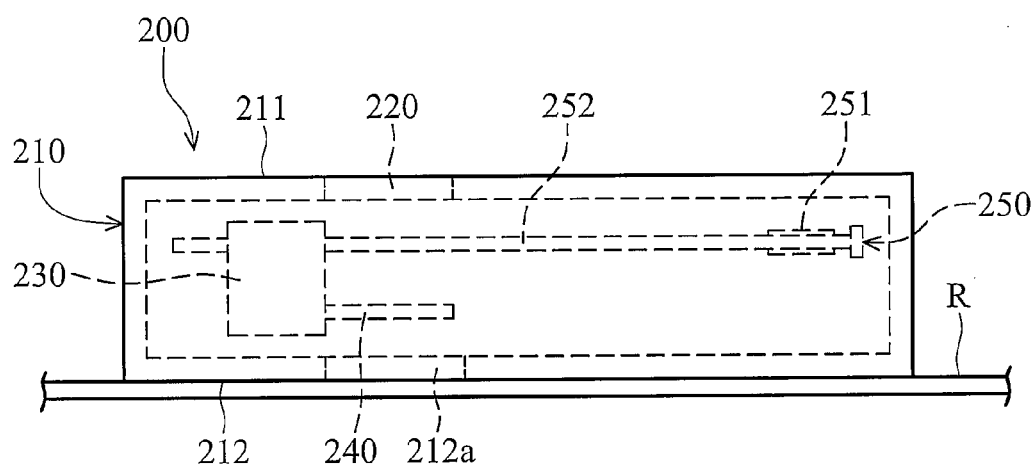
FIG. 3B is a schematic side view of the handheld recording apparatus of the second embodiment of the invention.

Referring to FIG. 3A and FIG. 3B, a handheld recording apparatus 200 comprises a casing 210, a transparent window 220, a recording mechanism 230, a transparent positioning plate 240, and a drive mechanism 250.

The casing 210 comprises a first sidewall 211 and a second sidewall 212 opposite thereto. The second sidewall 212 comprises a recording through hole 212a.

The transparent window 220 is disposed in the first sidewall 211 and corresponds to the recording through hole 212a of the second sidewall 212.

The recording mechanism 230 is movably disposed in the casing 210 and records information via the recording through hole 212a of the second sidewall 212. The recording mechanism 230 may comprise an inkjet head (not shown) recording the information on a recording medium R (such as a paper sheet) via the recording through hole 212a.

The transparent positioning plate 240 is connected to the recording mechanism 230 and between the transparent window 220 and the recording through hole 212a. Specifically, as connected to the movable recording mechanism 230, the transparent positioning plate 240 can selectively correspond to the transparent window 220 and recording through hole 212a. Moreover, as shown in FIG. 3A, the transparent positioning plate 240 comprises a plurality of positioning indices 241. The positioning indices 241 may be printed on the transparent positioning plate 240 and selectively correspond to the transparent window 220 and recording through hole 212a. Additionally, the size of the recording through hole 212a may slightly exceed the sizes of the transparent window 220 and transparent positioning plate 240.

The drive mechanism 250 is disposed in the casing 210 and is connected to the recording mechanism 230, moving the recording mechanism 230. Specifically, the drive mechanism 250 comprises a motor 251 and a lead screw 252 connected thereto. The recording mechanism 230 fits on and engages the lead screw 252. Accordingly, the lead screw 252 is rotated by the motor 251, and the recording mechanism 230 moves by rotation of the lead screw 252.

Similarly, the handheld recording apparatus 200 may be connected to an information processing device, such as a computer host, by a signal transmission cable or wireless transmission, receiving the information to be recorded or printed.

Figure 3C:
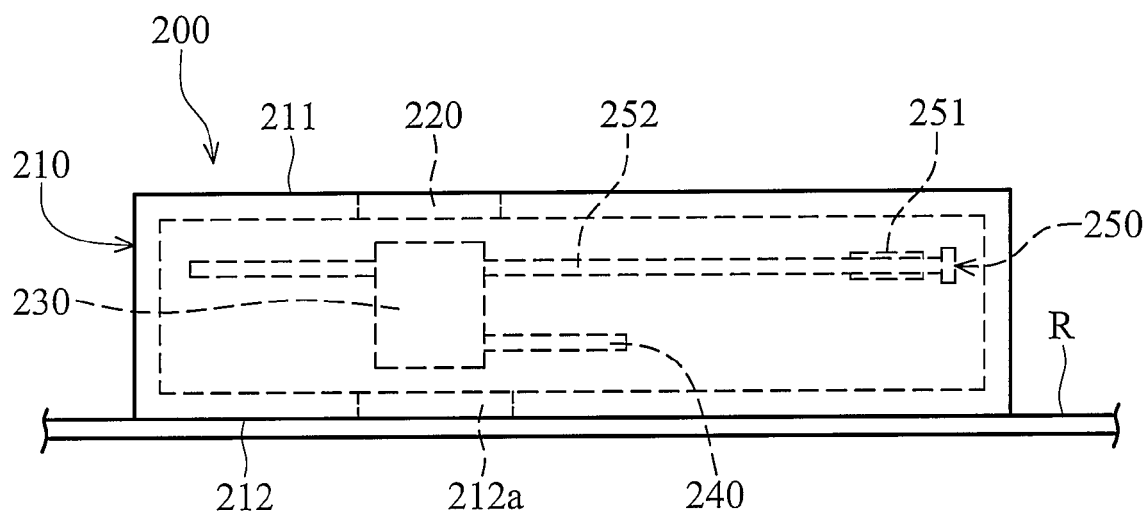
FIG. 3C is another schematic side view of the handheld recording apparatus of the second embodiment of the invention.

As shown in FIG. 3A and FIG. 3B, when using the handheld recording apparatus 200 to record the information on the recording medium R, a user can move the handheld recording apparatus 200 on the recording medium R and visually observe or select a specific recording position or area on the recording medium R via the transparent window 220, transparent positioning plate 240, and recording through hole 212a. Here, the positioning indices 241 on the transparent positioning plate 240 assist in selecting the recording area. Then, the handheld recording apparatus 200 can be directly actuated to record the information. For example, the user can just press a button (not shown) connected to the handheld recording apparatus 200 to record the information. At this point, the drive mechanism 250 moves the recording mechanism 230 to the recording through hole 212a, and the recording mechanism 230 records the information in the specific recording position or area on the recording medium R, as shown in FIG. 3C.

Accordingly, the handheld recording apparatus 200 rapidly and precisely records the information in the specific recording position or area on the recording medium R without deviation.

Third Embodiment

Figure 4A:
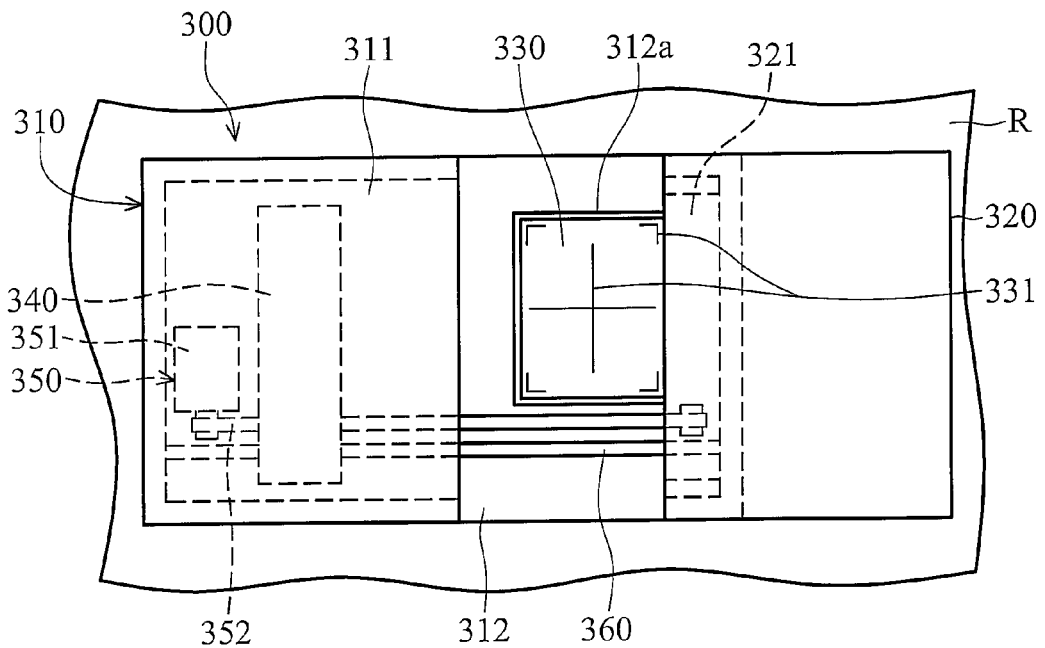
FIG. 4A is a schematic top view of a handheld recording apparatus of a third embodiment of the invention.
Figure 4B:
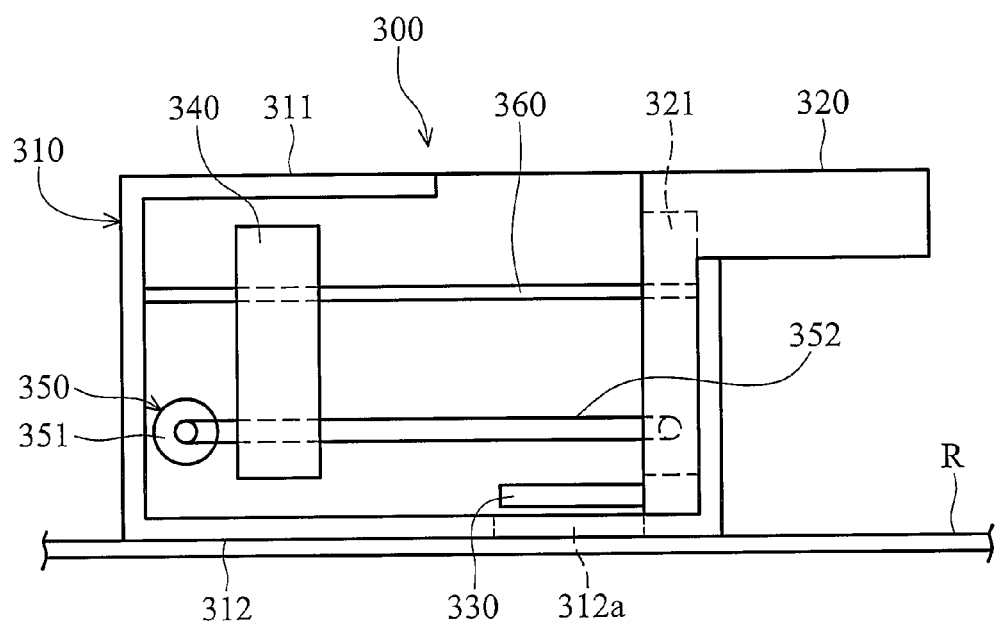
FIG. 4B is a schematic side view of the handheld recording apparatus of the third embodiment of the invention.

Referring to FIG. 4A and FIG. 4B, a handheld recording apparatus 300 comprises a casing 310, a sliding cover 320, a transparent positioning plate 330, a recording mechanism 340, a drive mechanism 350, and a guide bar 360.

The casing 310 comprises a first sidewall 311 and a second sidewall 312 opposite thereto. The second sidewall 312 comprises a recording through hole 312a.

The sliding cover 320 is connected to the casing 310 and comprises a passing hole 321. Specifically, the sliding cover 320 slides on the second sidewall 312 and detachably abuts the first sidewall 311.

The transparent positioning plate 330 is connected to the sliding cover 320 and between the first sidewall 311 and the second sidewall 312. Specifically, connected to the slidable sliding cover 320, the transparent positioning plate 330 can selectively correspond to the recording through hole 312a of the second sidewall 312. Moreover, as shown in FIG. 4A, the transparent positioning plate 330 comprises a plurality of positioning indices 331. The positioning indices 331 may be printed on the transparent positioning plate 330 and selectively correspond to the recording through hole 312a. Additionally, the size of the recording through hole 312a may slightly exceed that of the transparent positioning plate 330.

The recording mechanism 340 is movably disposed in the casing 310 and records information via the recording through hole 312a of the second sidewall 312. Specifically, the recording mechanism 340 moves onto the recording through hole 312a through the passing hole 321 of the sliding cover 320, recording information on a recording medium R (such as a paper sheet). Similarly, the recording mechanism 340 may comprise an inkjet head (not shown).

The drive mechanism 350 is disposed in the casing 310 and is connected to the recording mechanism 340, moving the recording mechanism 340. Specifically, the drive mechanism 350 comprises a motor 351 and a transmission belt 352 connected to the motor 351 and recording mechanism 340. Accordingly, the transmission belt 352 is operated by the motor 351, and the recording mechanism 340 moves by transmission of the transmission belt 352.

The guide bar 360 is disposed in the casing 310. The recording mechanism 340 fits and moves on the guide bar 360.

Similarly, the handheld recording apparatus 300 may be connected to an information processing device, such as a computer host, by a signal transmission cable or wireless transmission, receiving the information to be recorded or printed.

Figure 4C:
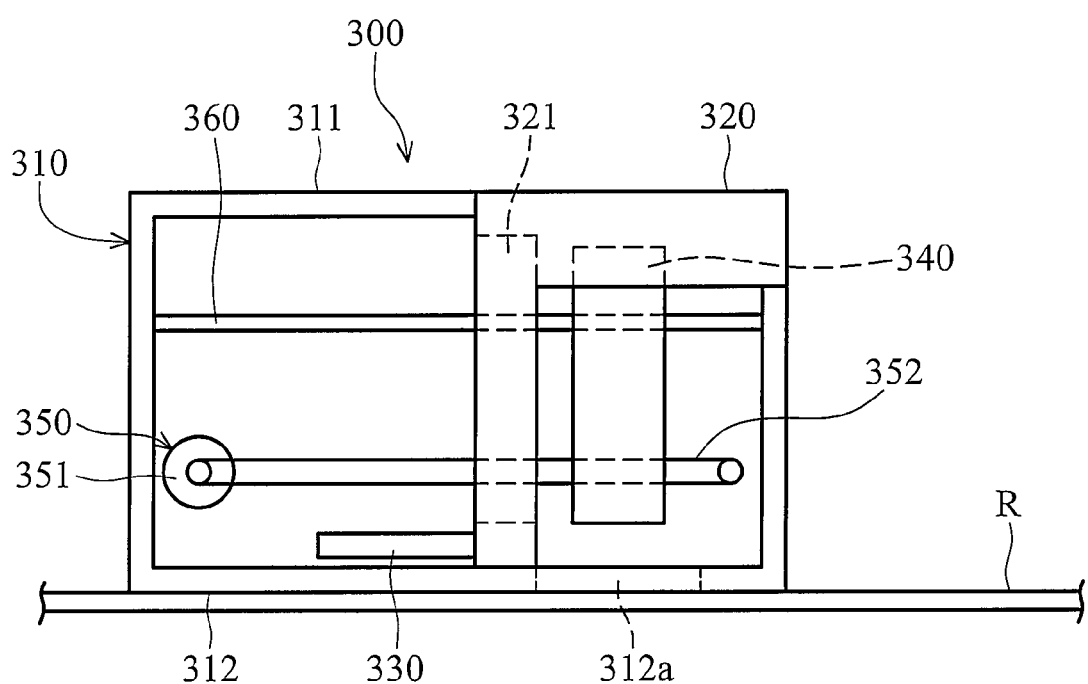
FIG. 4C is another schematic side view of the handheld recording apparatus of the third embodiment of the invention.

As shown in FIG. 4A and FIG. 4B, when using the handheld recording apparatus 300 to record the information on the recording medium R, a user can move the handheld recording apparatus 300 on the recording medium R and visually observe or select a specific recording position or area on the recording medium R from the top of the first sidewall 311 and via the transparent positioning plate 330 and recording through hole 312a. Here, the positioning indices 331 on the transparent positioning plate 330 assist in selecting the recording area. After the specific recording position or area is selected, the sliding cover 320 slides to abut the first sidewall 311. Then, the handheld recording apparatus 300 can be directly actuated to record the information. For example, the user can just press a button (not shown) connected to the handheld recording apparatus 300 to record the information. At this point, the drive mechanism 350 moves the recording mechanism 340 to the recording through hole 312a through the passing hole 321 of the sliding cover 320 and along the guide bar 360, and the recording mechanism 340 records the information in the specific recording position or area on the recording medium R, as shown in FIG. 4C.

Accordingly, the handheld recording apparatus 300 precisely records the information in the specific recording position or area on the recording medium R without deviation.

In conclusion, the disclosed handheld recording apparatuses provide functions of simplified recording operation and achieve an effect of precisely recording information on a recording medium.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A handheld recording apparatus, comprising:
   a casing comprising a first sidewall and a second sidewall opposite thereto, wherein the second sidewall comprises a recording through hole;
   a transparent window disposed in the first sidewall and corresponding to the recording through hole;
   a recording mechanism movably disposed in the casing and recording information via the recording through hole;
   a transparent positioning plate connected to the recording mechanism and between the transparent window and the recording through hole, selectively corresponding to the transparent window and recording through hole; and
   a drive mechanism disposed in the casing and connected to the recording mechanism, moving the recording mechanism.

2. The handheld recording apparatus as claimed in claim 1, wherein the transparent positioning plate comprises at least one positioning index selectively corresponding to the transparent window and recording through hole.

3. The handheld recording apparatus as claimed in claim 1, wherein the drive mechanism comprises a motor and a lead screw connected thereto, and the recording mechanism fits on and engages the lead screw.

4. The handheld recording apparatus as claimed in claim 1, wherein the size of the recording through hole exceeds the sizes of the transparent window and transparent positioning plate.

5. A handheld recording apparatus, comprising:
   a casing comprising a first sidewall and a second sidewall opposite thereto, wherein the second sidewall comprises a recording through hole;
   a sliding cover connected to the casing and sliding on the second sidewall;
   a transparent positioning plate connected to the sliding cover and between the first sidewall and the second sidewall, selectively corresponding to the recording through hole;
   a recording mechanism movably disposed in the casing and recording information via the recording through hole; and
   a drive mechanism disposed in the casing and connected to the recording mechanism, moving the recording mechanism.

6. The handheld recording apparatus as claimed in claim 5, wherein the sliding cover detachably abuts the first sidewall and comprises a passing hole, and the recording mechanism moves onto the recording through hole through the passing hole.

7. The handheld recording apparatus as claimed in claim 5, wherein the transparent positioning plate comprises at least one positioning index selectively corresponding to the recording through hole.

8. The handheld recording apparatus as claimed in claim 5, further comprising a guide bar disposed in the casing and on which the recording mechanism moves.

9. The handheld recording apparatus as claimed in claim 5, wherein the drive mechanism comprises a motor and a transmission belt connected to the motor and recording mechanism.

10. The handheld recording apparatus as claimed in claim 5, wherein the size of the recording through hole exceeds that of the transparent positioning plate.

* * * * *